United States Patent [19]
Bolduc

[11] 3,970,956
[45] July 20, 1976

[54] CYLINDRICAL ELECTRON BEAM DIODE

[75] Inventor: Paul E. Bolduc, Albuquerque, N. Mex.

[73] Assignee: The United States of America as represented by the United States Energy Research and Development Administration, Washington, D.C.

[22] Filed: July 24, 1975

[21] Appl. No.: 598,973

[52] U.S. Cl. .......................... 331/94.5 PE; 330/4.3; 313/346 R
[51] Int. Cl.² .......................................... H01S 3/09
[58] Field of Search ..................... 331/94.5; 330/4.3; 313/336, 346

[56] References Cited
UNITED STATES PATENTS 3,349,339  10/1967  Thorington ..................... 331/94.5 P
3,798,570  3/1974  Hagood et al ................ 331/94.5 PE Primary Examiner—William L. Sikes
Attorney, Agent, or Firm—Dean E. Carlson; Dudley W. King; Richard E. Constant

[57] ABSTRACT

A diode discharge device may include a tubular anode concentrically encircled by and spaced from a tubular cathode electrode with ends intermediate the ends of said anode electrode, and a metal conductive housing having a tubular wall disposed around the cathode electrode with end walls connected to the anode electrode. High energy electron current coupling is through an opening in the housing tubular wall to a portion of the cathode electrode intermediate its ends. Suitable utilization means may be within the anode electrode at positions to be irradiated by electrons emitted from the cathode electrode and transmitted through the anode walls.

10 Claims, 4 Drawing Figures

U.S. Patent July 20, 1976 3,970,956
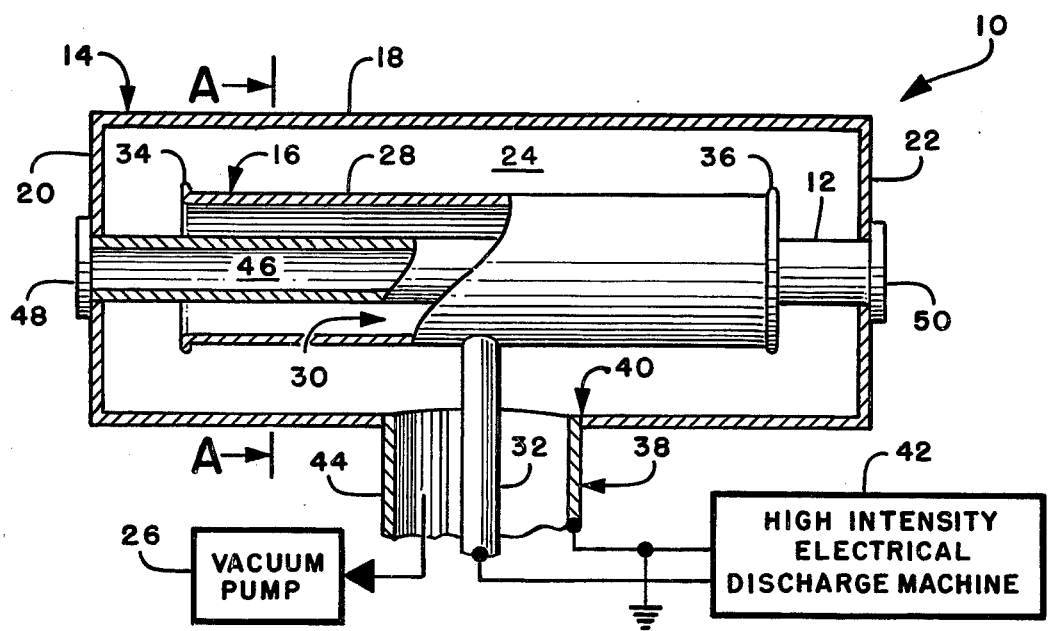
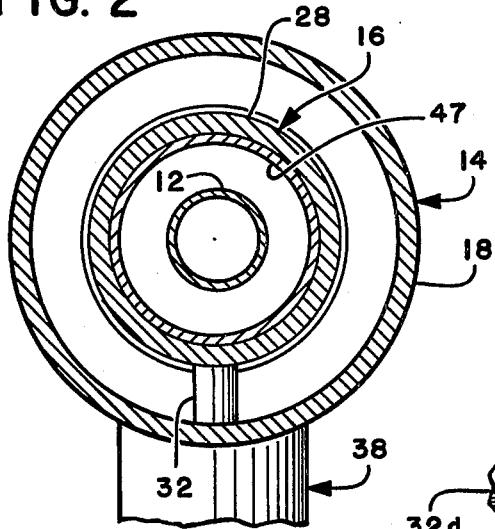
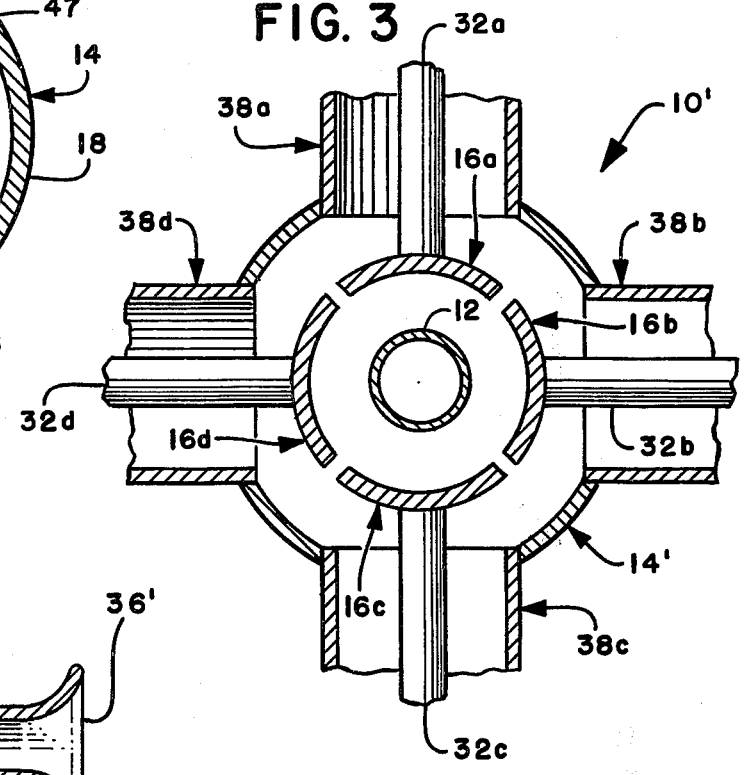
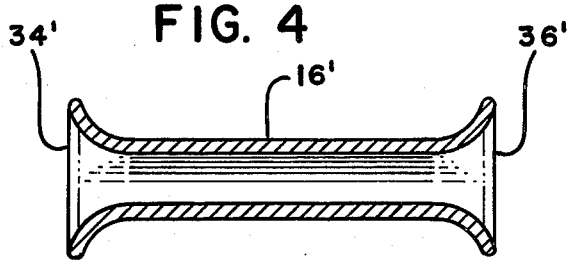

CYLINDRICAL ELECTRON BEAM DIODE

BACKGROUND OF INVENTION

High intensity electrical discharge machines are being built or developed which are capable of producing electrical pulses having currents of from about 100,000 to greater than 1,000,000 amperes at voltages of from about 100,000 volts to greater than 20,000,000 volts. Such electrical pulses may be used to produce electron beams which in turn may be utilized to provide interactions with gases or other materials for use in materials studies, testing of deposition of high energy in materials, production of various radiations, or for similar purposes. Various electrical discharge devices, such as diodes and the like, are often connected to these machines and utilized to produce a particular electron beam discharge to effect some one or more of the above described uses. One such device utilizes concentric tubular electrodes to produce a radially converging electron beam discharge to irradiate a cylindrical-shaped volume. Many of these discharge devices, it has been found, are limited as to the total current which may be carried by the anode and the peak voltage which may be produced and brought to bear in the device to provide a desired use. These devices are often limited in these respects by factors that are inherent in the design or configuration of the device. Some of these limitations may include magnetron capture mechanism, preferential emission from the cathode ends, and azimuthal asymmetry in current density as well as voltage breakdowns across insulator surfaces in the anode-cathode region of the discharge device.

SUMMARY OF INVENTION

In view of the above, it is an object of this invention to provide an electron beam diode which is capable of producing a high intensity electron beam which is directed uniformly radially inward into an elongated discharge region.

It is a further object of this invention to provide such an electron beam diode in which the magnetron capture mechanism effect is substantially reduced.

It is a further object of this invention to provide such an electron beam diode which is capable of being energized by more than one high intensity electrical discharge machine.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention, may be made by those skilled in the art within the principles and scope of the invention as expressed in the appended claims.

The invention relates to an electron beam diode which includes a tubular cathode electrode substantially concentrically encircling and spaced from a tubular anode electrode with a metal housing including a tubular wall encircling the cathode and anode electrodes and end walls connected to the anode electrode, together with means for injecting an electron current through the tubular wall of said housing into a portion of the cathode electrode intermediate its ends.

DESCRIPTION OF DRAWING

The invention is illustrated in the accompanying drawing wherein:

FIG. 1 is a partially cutaway view of an electron beam diode incorporating the features of this invention;

FIG. 2 is a cross-sectional view along line A—A of FIG. 1 of the diode and a typical cathode electrode;

FIG. 3 is a partially cutaway view of an electron beam diode having a segmented cathode electrode fed by independent energy sources; and FIG. 4 is a cross-sectional view of another cathode electrode which may be utilized in the diode of FIG. 1.

DETAILED DESCRIPTION

A cylindrical diode discharge device 10 which incorporates the features of this invention, as shown in FIGS. 1 and 2, may include a tubular anode electrode 12 suitably supported within an electrically conductive housing 14 with a tubular cathode electrode 16 appropriately positioned between the housing 14 and anode electrode 12. Housing 14 may be formed from a tubular wall 18 in which anode 12 is coaxially supported by a pair of disc-like end walls 20 and 22. Anode 12 is attached to end walls 20 and 22 of housing 14 so as to provide electrical connection therebetween and to form a tubular-shaped enclosure 24 which may be appropriately evacuated to a level in which a space charge limited discharge may be supported, such as to a vacuum of from about $10^{-5}$ to $10^{-7}$ Torr, using a suitable vacuum pump 26 coupled to enclosure 24.

Cathode 16 may be formed from a generally tubular wall member 28 which is concentrically supported around anode 12 and spaced therefrom by a discharge gap 30 using a suitable cathode shank or mount 32. Cathode shank 32 is attached to the tubular wall 28 of cathode 16 intermediate or between the ends 34 and 36 of cathode 16, preferably at the midpoint. Ends 34 and 36 are spaced from end walls 20 and 22 of housing 14 intermediate the ends of anode 12 a distance comparable to the spacing between wall member 28 and tubular wall 18. Ends 34 and 36 may be provided with a suitable rounded flange or arcuate configuration about the circumference of wall member 28, as shown, to minimize preferential electron emission from the cathode ends.

The cathode shank 32 may form a part of, or be connected to a suitable high energy transmission line 38 through an opening 40 in tubular wall 18 of housing 14, which in turn may be coupled to an appropriate high intensity electrical discharge machine 42. Housing 14 and anode 12 may also be coupled through transmission line 38 via tubular conductive element 44 to machine 42. The transmission line 38, formed in the embodiment shown by the coaxial cathode shank 32 and tubular conductive element 44, provides the electrical connection to the discharge machine 42 as well as a conduit through which evacuation of enclosure 24 may be achieved without perturbing the electrical fields in the anode-cathode region of diode 10. Other forms of transmission lines and/or pulse forming networks may be utilized in place of the coaxial transmission line shown, such as a strip line, without varying from the intent of the present invention.

The high intensity electrical discharge machine 42 may be any appropriate discharge machine which is capable of producing high intensity negative currents at voltages of from about 0.5 to 10 million volts (MV) or more. The current discharges may, in diodes formed according to this invention, typically be at levels of from about 50 to 500 kiloamperes (kA) and for time periods in the neighborhood from about 30 to 120 nanoseconds.

Anode 12, in most applications, should be made of a material which is electrically conductive at the discharge conditions produced by diode 10 and discharge machine 42 and strong enough to support the difference in pressure between enclosure 24 and the pressure which may be in the interior 46 of anode 12, and which is substantially transparent to high energy or relativistic electrons. In those applications where it is desirable to minimize generation of x-rays and other radiations, the anode 12 should also be made of a relatively low atomic number (low Z) material. Particularly suitable materials for these applications may include titanium, nickel, aluminum and certain insulator and conductive material composites, such as a polystyrene-stainless steel mesh or screen composite. Using a material like nickel, differences in pressure between enclosure 24 and interior 46 of 6 to 10 atmospheres may be withstood with an anode thickness of from about 1 to 1.5 mils. If it is desired to irradiate the interior 46 of anode 12 with x-rays, for example, the anode 12 may be formed from a high Z material or be coated or covered with a high Z material such as tantalum or tungstem, or the like.

The wall 28 of cathode 16 may be made of any suitable electrically conductive material at its outer surface or layer which is treatable to reduce electron emission, such as by being highly polished, and which has sufficient structural strength to support the cathode in the configuration shown and under the discharge conditions to which the diode 10 may be subjected and may include such metals as stainless steel, aluminum, or the like. The inner surface or layer 47 of cathode 16, as shown in greater detail in FIG. 2, may be formed from a material or structure which will enhance electron emission. Layer 47 may typically be formed from carbon (such as in the form of a thin carbon tube suitably attached to the inner surface of the cathode or as a coating applied from a carbon dust suspension spread over the inner surface of the cathode) or an arrangement of sharp edges or points directed generally inward towards anode 12 (such as needle or razor-blade like protuberances). The housing 14 should be made of a metallic material which is capable of withstanding the difference in pressure between enclosure 24 and the exterior of the housing, including such materials as aluminum, steel, or the like.

The electrical discharge produced by discharge machine 42 between cathode 16 and anode 12, because of its intensity and the structure of diode 10, will result in a very high energy electron beam current not only between the cathode 16 and anode 12 but also within the interior 46 of anode 12. This cylindrical shaped discharge of radially converging relativistic or high energy electrons may be utilized to bombard or irradiate materials or gases disposed in the interior 46 or may be utilized, as described above, to produce x-rays for irradiation of gases or materials, as desired. For example, interior 46 may be filled with a gas which may be lased upon irradiation by electrons or x-rays at suitable pressures and appropriate laser mirrors 48 and 50 positioned at either end of interior 46 of anode 12 to produce a laser cavity from which a laser light beam may be extracted in a well known manner. Typical lasing mediums which may be utilized in interior 46 may include carbon dioxide, xenon, argon and helium-neon, etc. at pressures of from about 1 to 100 atmospheres. When utilized as a cylindrical laser diode, the diode 10 shown may produce a wide range of laser light beam energies and sizes depending upon the dimensions of diode 10 elements and the discharge characteristics of discharge machine 42. The primary electrons produced in the diode 10 discharge, it has also been found, may penetrate the thin anode electrode 12 and deposit a portion of their energy in the process of ionization and energy inversion of the gas in interior 46 and then repenetrate the anode 12 wall. These electrons are then decelerated in the cathode-anode discharge region 30 and re-emitted through the anode 12 wall to interior 46 for further inversion of gas energy states of gas enclosed therein. This multiple pass mechanism effects more efficient use of the primary beam in inverting a laser gas. In addition, the electron beam produced in diode 10 directly irradiates interior 46 without need of external magnetic fields or other controls to effect a direct and efficient irradiation of interior 46 without adversely effecting the laser cavity operation between mirrors 48 and 50. Since the electrical discharge from discharge machine 42 is supplied to cathode electrode 16 at a location midway between its ends, the discharge currents are divided equally between two ends of cathode 16 and thus permits a large discharge current to flow through the anode-cathode discharge region 30 without magnetron capture to provide a very large energy electron beam discharge within diode 10. If is desired, an external longitudinal magnetic field may be produced along the longitudinal axis of interior 46 (not shown) to increase the electron path length in interior 46 to produce more effective ionization of gases enclosed therein but should be kept at a level to prevent longitudinal magnetic field capture from occuring in the anode-cathode discharge region 30.

Solid materials such as nuclear reactor fuel pins or other structures (not shown) may be positioned within interior 46 at a location to be irradiated by the electron beam or x-ray radiations in order to measure characteristics or effects to these materials under such environments.

In order for the cylindrical diode 10 to operate most effectively, it has been found that the inward directed electrical field strength between cathode 16 and anode 12 be equal to or greater than the outward directed electrical field strength between cathode 16 and housing 14. The diode 10 may be viewed as two parallel connected impedances between these respective elements in which the impedance between the cathode 16 and housing 14 should be selected to be at a level of about five times that of the impedance between cathode 16 and anode 12 to maintain this relative electrical field strength and preferential discharge between the cathode 16 and anode 12.

Electron beam diodes including the features described above with respect to diode 10 were constructed using an anode having an outside diameter of 2 inches and a wall thickness of 70 mils, a housing having an inside diameter of 14 inches, each being 54 inches long, and cathodes of different diameters and lengths. The diodes were operated from a discharge machine which produced a discharge pulse having a peak voltage of from about 1.2 to 1.6 MV with discharge currents of from about 100 to 120 kA for about 120 nanoseconds. The inner surface of the cathodes were coated with a carbon dust suspension to provide a thin carbon electron emissive surface thereover. The cathode walls were 250 mils in thickness and were finished with a quarter inch radius at each end. The discharge characteristics of the diodes using different cathode diameters and lengths for the same anode and housing are shown in the table.

| Cathode diameter (in) | length (in) | Input Current (kA) | ANODE CURRENT end a (kA) | end b (kA) | Discharge Efficiency % | Ratio of Inner to Outer Cathode Field Strengths |
|---|---|---|---|---|---|---|
| 4 | 12 | 107.6 | 49.1 | — | 95 | 1.83 |
| 4 | 6 | 110.0 | 48.4 | 46.0 | 87 | 1.83 |
| 5 | 9 | 100.2 | 36.3 | 40.2 | 76 | 1.12 |
| 5 | 9 | 100.2 | 37.4 | 39.0 | 76 | 1.12 |
| 5 | 9 | 100.2 | 37.4 | 38.4 | 76 | 1.12 |
| 5 | 18 | 106.1 | 42.1 | 41.0 | 78 | 1.12 |
| 5 | 18 | 113.9 | 46.1 | 42.1 | 77 | 1.12 |
| 5 | 18 | 106.1 | 40.2 | 41.0 | 77 | 1.12 |
| 7 | 12 | 106.1 | 17.3 | 16.5 | 33 | 0.55 |
| 7 | 12 | 111.5 | 18.7 | 17.7 | 34 | 0.55 |
| 7 | 12 | 97.8 | 16.4 | 15.6 | 33 | 0.55 |
| 7 | 24 | 117.4 | 25.7 | 24.0 | 44 | 0.55 |
| 7 | 24 | 119.8 | 25.3 | 24.9 | 42 | 0.55 |
| 7 | 24 | 122.2 | 27.6 | 28.0 | 46 | 0.55 |

It can be seen from the table that the currents through the respective halves or ends of the anode were approximately equal and that the discharge efficiency or percent of electron discharge between the cathode and anode compared to the total input current decreased with increasing cathode diameter since the housing diameter was maintained constant which decreased the ratio of inner to outer electric field strengths at the cathode. The difference in peak current in the anodes was less than 11% for all the diode discharges indicating a high degree of axial uniformity in current distribution about the mid-plane of the anode. The 4 inch inner diameter cathodes indicated a tendency towards producing an electron beam pinch at the center of the cathodes. The 5 inch inner diameter cathodes produced the best axial and azimuthal symmetry. The 7 inch inner diameter cathodes exhibited a strong preferential emission from the ends of the cathodes.

If it is desired, the energy delivered to the diode may be increased by dividing the cathode into two or more longitudinal segments and then simultaneously directing appropriate electrical discharge currents through each of the segments from different high intensity electrical discharge machines, such as shown by the four segment cathode electron beam diode 10' in FIG. 3. In this embodiment, the cathode segments 16a, 16b, 16c and 16d form an essentially tubular cathode and are equally spaced about the anode 12 within housing 14' and electrically coupled to their respective discharge machines (not shown) by transmission lines 38a, 38b, 38c and 38d by cathode shanks 32a, 32b, 32c and 32d respectively. Such an arrangement may be used to produce megajoule laser beams from within an appropriately sized diode and lasing medium.

In order to further decrease preferential electron emission from the ends of cathode of the cylindrical electron beam diode, the cathode ends may be flared as indicated by the cathode 16' shown in FIG. 4 at ends 34' and 36'. The amount of flare and the length of the flare may depend upon the particular diode arrangement and discharge characteristics resulting therefrom and from the discharge characteristic of the discharge machine coupled to the cathode. This reduction in preferential emission is achieved by reducing the electrical field strength at the respective cathode ends.

What is claimed is:

1. An electron beam diode comprising an elongated generally tubular anode essentially transparent to relativistic electrons; a generally tubular cathode electrode coaxially encircling and spaced from said anode electrode with ends intermediate the ends of said anode electrode; a conductive housing including a generally tubular wall coaxially encircling said cathode and anode electrodes and spaced further from said cathode electrode than said cathode-anode electrode spacing and end walls connected to said anode electrode to substantially enclose said cathode electrode and form an evacuable region between said cathode electrode and said anode electrode and housing; and means for connecting a high energy electrical pulse through said tubular housing wall to said cathode electrode at a location intermediate its ends.

2. The diode of claim 1 wherein the inner surface of said cathode electrode facing said anode electrode includes means for enhancing electron emission therefrom.

3. The diode of claim 2 wherein said electron emission enhancing means comprises a layer of carbon.

4. The diode of claim 1 wherein said connecting means includes an electrical conductor connected to an outer surface of said cathode electrode midway between its ends and passing perpendicular to said cathode electrode through an opening in the tubular housing wall.

5. The diode of claim 1 wherein said cathode electrode comprises a plurality of segments, each segment having a connecting means passing through the tubular housing wall.

6. The diode of claim 1 wherein each end of said cathode electrode is of arcuate configuration about the circumference of the cathode electrode.

7. The diode of claim 6 wherein the diameter of each end of said cathode electrode is larger than central portions thereof.

8. The diode of claim 1 including means within said anode electrode for utilizing the electrons transmitted through said anode electrode.

9. The diode of claim 8 wherein said utilization means includes a lasing cavity and a lasing medium.

10. The diode of claim 1 wherein the electrical field strength between said cathode electrode and said anode electrode is equal to or greater than the electrical field strength between said cathode electrode and said housing.

* * * * *